United States Patent [19]
Farrell

[11] Patent Number: 4,579,518
[45] Date of Patent: Apr. 1, 1986

[54] APPARATUS FOR MAKING BLOW MOLDED ARTICLES

[75] Inventor: John J. Farrell, Greenbrook, N.J.

[73] Assignee: Wedco, Inc., Bloomberg, N.J.

[21] Appl. No.: 653,985

[22] Filed: Sep. 24, 1984

[51] Int. Cl.⁴ ............................................. B29C 49/06
[52] U.S. Cl. .................................. 425/539; 264/538; 425/540
[58] Field of Search ............... 425/190, 522, 523, 528, 425/529, 534, 537, 539, 540, 533; 264/538

[56] References Cited

U.S. PATENT DOCUMENTS

| | | | |
|---|---|---|---|
| 3,100,913 | 8/1963 | De Matteo | 425/537 |
| 3,507,005 | 4/1970 | Wiley et al. | 425/534 |
| 3,816,046 | 6/1974 | Farrell | 425/242 |
| 4,047,873 | 9/1977 | Farrell | 425/533 |
| 4,239,475 | 12/1980 | Rainville | 425/534 |

Primary Examiner—Jay H. Woo
Assistant Examiner—Timothy W. Heitbrink
Attorney, Agent, or Firm—Sprung Horn Kramer & Woods

[57] ABSTRACT

An apparatus for making hollow articles having a rotatable polygonal turntable, a parison forming station at one side face of the turntable, a blow molding station at another side face of the turntable and a stripping station at still another side face of the turntable. The apparatus has means for connecting at least one core rod on which the parison is formed to the turntable, such that at least one core rod is parallel to a side face of the turntable, and for rotation therewith.

6 Claims, 5 Drawing Figures

APPARATUS FOR MAKING BLOW MOLDED ARTICLES

BACKGROUND OF THE INVENTION

This invention relates to an apparatus for forming blow molded articles, such as containers, from thermoplastic material. More particularly, the present invention is directed to an apparatus capable of providing blow molded containers of various heights (lengths).

The height or length of a container producible from a blow molding apparatus such as that described in U.S. Pat. No. 4,047,873 is limited since the projected area of each core rod must coincide with the center line of the mold clamp. The high pressures involved in such apparatus require a balanced design since unbalancing will lead to flashing of the parison from the core rod.

Heretofore the formation of long containers necessitated the use of large blow molding machines, and in the case of ultra long containers, a two piece construction had to be employed (two equal halves adhered together).

SUMMARY OF THE INVENTION

It is an object of the present invention to produce longer containers in one piece from blow molding apparatus without increase in the size of the turntable or without necessitating movement of the beams.

The aforesaid object, as well as other objects and advantages of the present invention is provided by an apparatus for making hollow articles. The apparatus has a rotatable polygonal turntable, a parison forming station at one side face of the turntable, a blow molding station at another side face of the turntable and a stripping station at still another side face of the turntable. The apparatus has means for connecting to the turntable at least one core rod on which the parison is formed to the turntable, such that at least one core rod is parallel to a side face of the turntable and for rotation therewith. Such means for connecting the core rods to the turntable include an extension arm fixed to the turntable and extending perpendicularly outwardly from a side face thereof and means for mounting a core rod perpendicular to the arm.

BRIEF DESCRIPTION OF THE DRAWINGS

For the purpose of illustrating the invention, there is shown in the drawings forms which are presently preferred; it being understood, however, that this invention is not limited to the precise arrangement and instrumentalities shown.

DETAILED DESCRIPTION OF THE INVENTION

Figure 1:
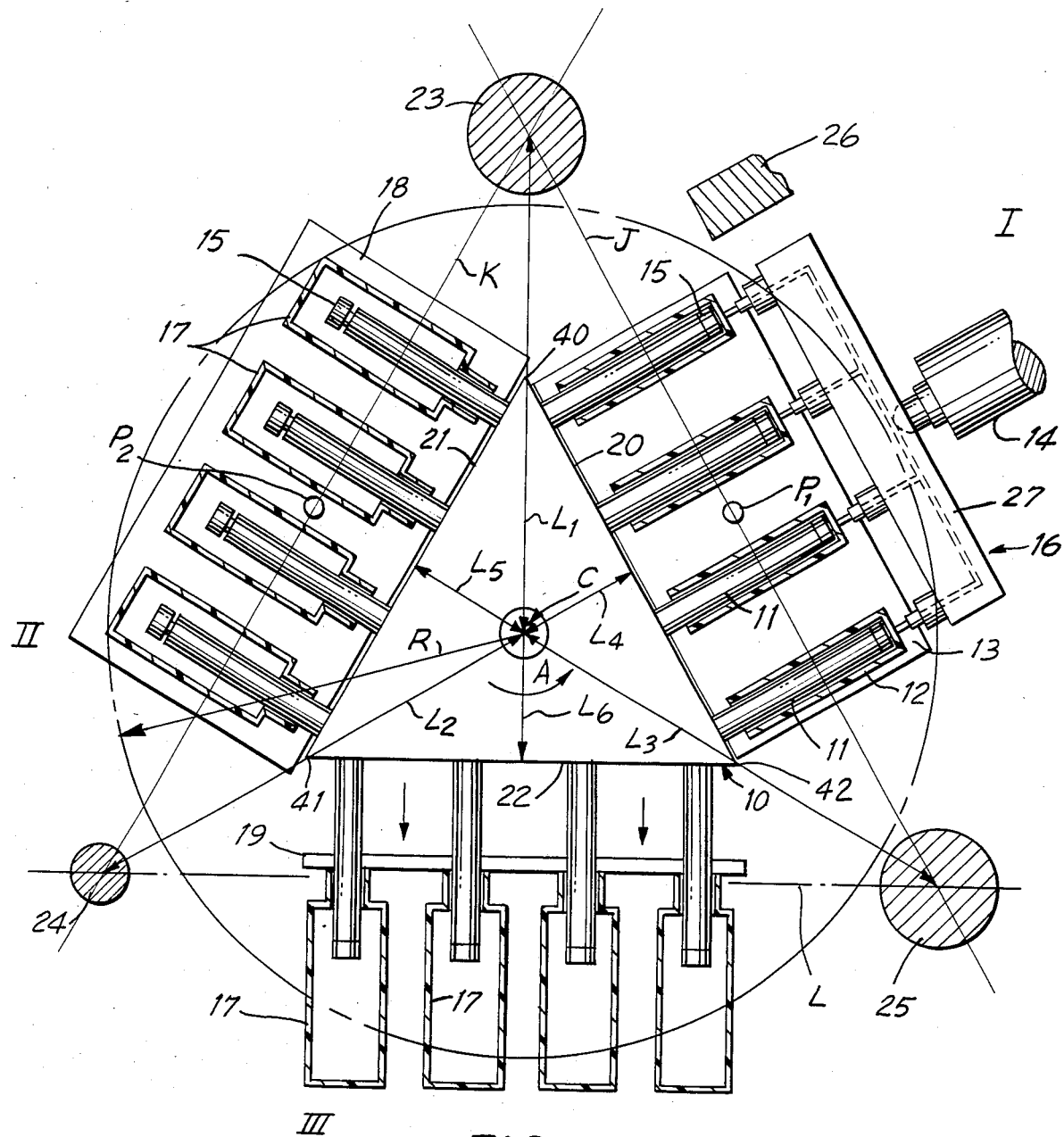
FIG. 1 is a top plan view of a prior art injection blow molding apparatus having three stations for producing a single layer container, taken along the mold split line.

Referring to the drawings in detail, wherein like numerals indicate like elements there is shown in FIG. 1 a prior art injection molding apparatus 116 comprising an injection molding station I, a blow molding station II and a stripping station III. The structure and operation of typical blow molding machines is described in U.S. Pat. Nos. 4,047,873 and 3,816,046, the entire contents of which are incorporated by reference herein.

In FIG. 1 there is shown a triangular shaped (equilateral triangle) rotatable indexing turntable 10 having side faces 20, 21 and 22. Each of side face 20, 21 and 22 have a series of core rods 11 (typical) mounted perpendicularly thereto and rotatably indexed at the aforementioned stations. The core rod 11 indexing is performed in the well-known customary manner.

The core rods 11 are of a similar configuration to the core rod and mechanism for actuating the core rod to provide blow air as described in U.S. Pat. No. 3,836,305, the entire contents of which is incorporated by reference herein. Side face 20, 21 and 22 contain trigger bars (not shown) to activate core rod valves (not shown) to allow air to flow through the core rods.

At the injection molding station I, having a center of pressure $P_1$, a plastic parison 12 is injection molded in mold 13 onto each core rod 11 by injector 14 via manifold 27 in the customary manner. Such injection molded plastic can be any thermoplastic.

The turntable 10 having a maximum swing radius R is then indexed counterclockwise in the direction of arrow A into blow molding station II, having a center of pressure $P_2$, wherein each parison 12 is blow molded in mold 18 to form containers 17. During such rotation, rods 11 with parisons 12 thereon, pass by machine obstruction 26. In such blow molding, retractably extensible valve heads 15 (which are depicted in a seated or retracted position in FIG. 1) on core rods 11 open to allow pressurized gas, e.g., air, to flow in order to blow-up each parison 12 to form containers 17.

After blow molding in station II, the turntable 10 is indexed once again in a counterclockwise fashion to stripper station III, wherein the containers 17 are stripped from core rods 11 by stripper 19.

In order to keep the injection molding apparatus 16 balanced, the apparatus 16 is designed such that the center of the support posts 23 for apparatus 16 is located at the point of intersection of the center lines J and K which respectively pass through the middle (longitudinal center) of the molds 13 and 18 (lines J and K are respectively parallel to side faces 20 and 21). The center of post 24 is at the intersection of lines K and L; the center of post 25 is at the intersection of lines J and L.

The centers of posts 23, 24 and 25 coincide with the imaginary lines $L_1$, $L_2$ and $L_3$, passing through point C and the three points of intersection of faces 20 and 21; faces 22 and 21; and faces 22 and 20, namely points 40, 41 and 42. Point C is located at the intersection of the three imaginary lines, $L_4$, $L_5$ and $L_6$, perpendicular to and passing through the center of side faces 20, 21 and 22. Center of pressure $P_1$ for station I is at the intersection of the imaginary line J passing through the centers of posts 23 and 25 and the imaginary line $L_4$ passing through the center of side face 20 and center C of turntable 10. Center of pressure $P_2$ for station II is at the intersection of the imaginary line K passing through posts 23 and 24 and the imaginary line $L_5$ passing through the center of side face 21 and center C of turntable 10. Posts 23, 24, 25 have support beams (not shown).

It is not possible to employ core rods 11 longer than that those presently depicted in FIG. 1, therefore it is not possible to produce longer containers 17 with the prior art apparatus 16 since the pressure would be unbalanced, i.e., the imaginary lines between the center of the posts 23, 24, 25 would not coincide with the longitudinal center of the rods 11. Furthermore, if the rods 11 are too long, they will not clear the posts 23, 24, 25 during indexing.

Figure 2:
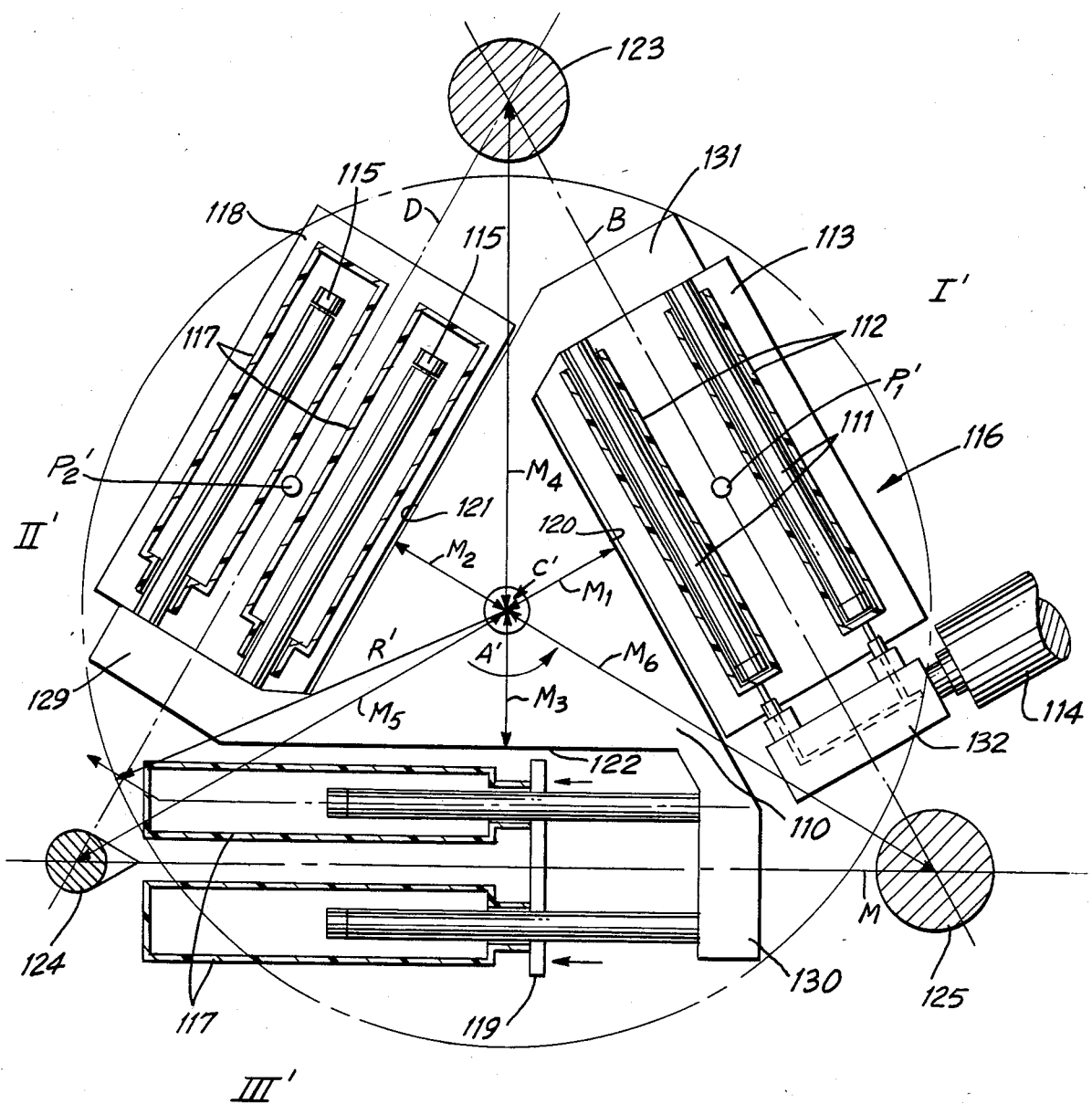
FIG. 2 is a top plan view of an injection blow molding apparatus according to the present invention having three stations for producing a simple layer container, taken along the mold split line.

In FIG. 2 an injection molding apparatus according to the present invention is depicted comprising an injection molding station I', a blow molding station II' and a stripping station III'. Such stations operate much in the manner as described hereinabove for stations I, II and III in FIG. 1.

In FIG. 2, there is depicted a triangular shaped (equilateral triangle) rotatable indexing turntable 110 having side faces 120, 121 and 122.

Projecting out from turntable 110 and perpendicular to side face 121 is extension arm 129; projecting out from turntable 110 and perpendicular to side face 122 is extension arm 130; and projecting out from turntable 110 and perpendicular to side face 120 is extension arm 131. Each arm 129, 130 and 131 has a trigger bar located in a recess therein (not shown in FIG. 2). Extending perpendicularly from each arm 129, 130, 131, respectively, and parallel to side faces 120, 121, 122, respectively, are a series of core rods 111 (typical).

At the injection molding station II', having a center of pressure $P'_1$ a plastic parison 112 is injection molded in mold 113 onto each core rod 111 by injector 114 in the customary manner.

The turntable 110 having a maximum swing radius R' is then indexed counterclockwise in the direction of arrow A' into blow molding station II', having a center of pressure $P'_2$, wherein each parison 112 is blow molded in mold 118 to form containers 117. In such blow molding, retractably valve heads 115 (which are depicted in a seated or retracted position in FIG. 2) on core rods 111 open to allow pressurized gas, e.g., air, to flow in order to blow-up each parison 112 to form containers 117.

After blow molding in station II', the turntable 110 is indexed once again in a counterclockwise fashion to stripper station III', wherein the containers 117 are stripped from core rods 111 by stripper 119.

Using the same size turntable and the same beam configuration as described above for the prior art apparatus 16, the apparatus 116 of the present invention is able to produce much longer bottles 117, than bottles 17 produced from prior art apparatus 16.

In apparatus 116, the two core rods 111 on each of arms 129, 130, 131 are disposed equal distances on either side of the imaginary center lines B, D and M passing through the centers of posts 123, 124, 125, i.e., the rods 111 are thus balanced (the central axis of each core rod 111 is disposed an equal perpendicular distance from the imaginary line M joining the centers of posts 124 and 125; the imaginary line D joining the centers of posts 123 and 124 and the imaginary line B joining the centers of posts 123 and 125). The centers of posts 123, 124 and 125 coincide with the imaginary lines B and D passing respectively through the longitudinal centers of molds 113 and 118 (lines B and D are parallel to face 120 and face 121, respectively). The centers of posts 123, 124 and 125 coincide with the imaginary lines, $M_4$, $M_5$ and $M_6$, passing through point C and the three points of intersection of faces 120 and 121; faces 122 and 121 and faces 120 and 122. Point C is located at the intersection of the three imaginary lines $M_1$, $M_2$ and $M_3$, perpendicular and passing through the center of faces 120, 121 and 122.

If one rod 111 is employed on each arm, the center of such rod 111 would be positioned on such imaginary lines B, D and M joining such adjacent posts. Center of pressure $P_1'$ for station I' is at the intersection of the imaginary line B passing through the centers of posts 123 and 125 and the imaginary line passing throught the center of side face 120 and center C' of turntable 110. Center of pressure $P_2'$ for station II' is at the intersection of the imaginary line D passing through posts 123 and 124 and the imaginary line passing through the center of side face 121 and center C' of turntable 110. Imaginary line M passes through the centers of posts 124 and 125.

It is to be understood that while there is above described operations for forming a one-layered parison, these operations could be repeated to form any desired number of layered parisons and resultantly multilayered hollow articles such as that produced in U.S. Pat. No. 4,047,873.

It is also understood that while the preferred embodiment has been described in terms of the operation of four core rods at each station in FIG. 1 and two core rods at each station in FIG. 2, clearly any number of such core rods could be mounted for operation at each of the stations depending on the size of the apparatus.

Figure 3:
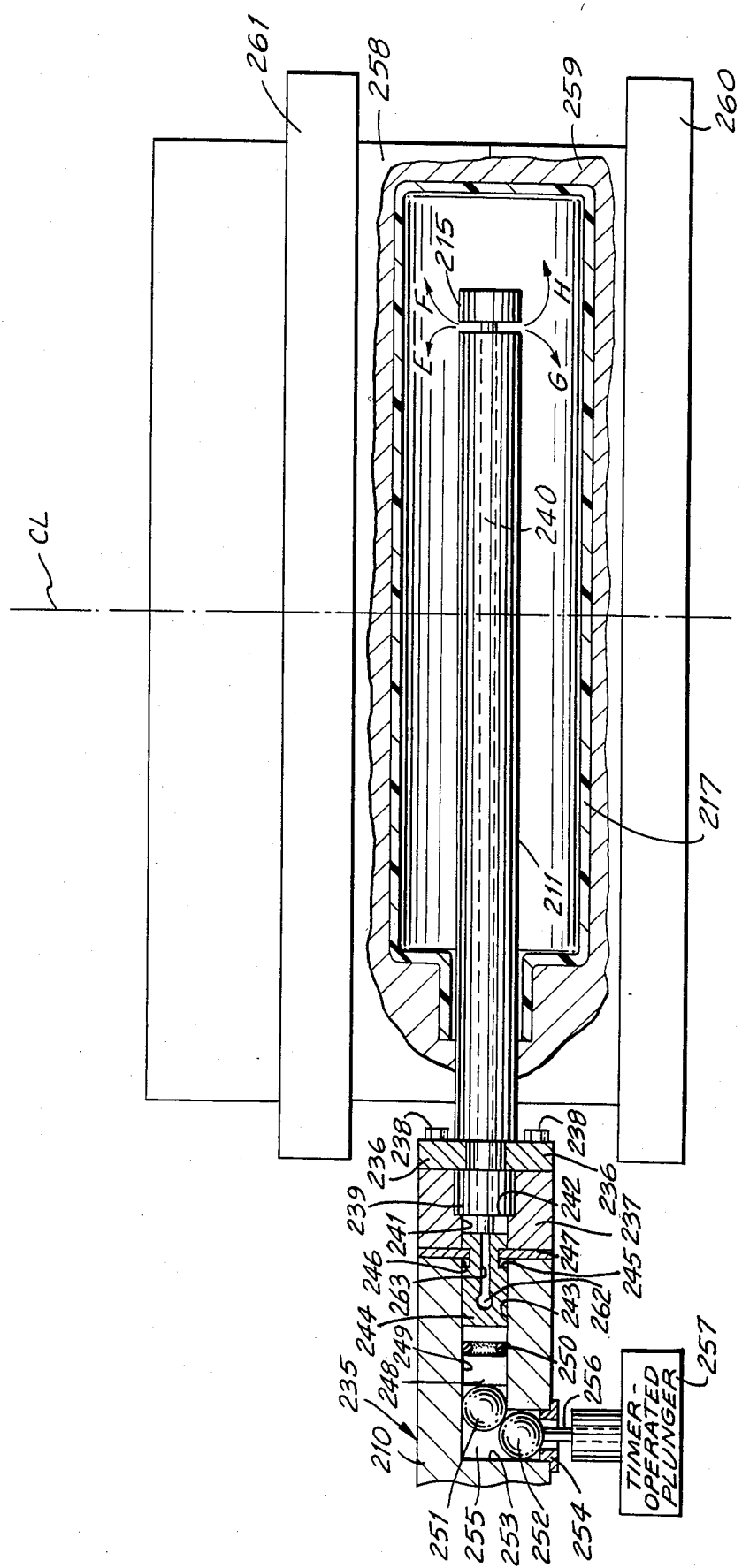
FIG. 3 is an elevational view in cross-section of a typical trigger bar—core rod—mold assembly such as employed in the injection blow molding apparatus of FIG. 2.

In FIG. 3 there is depicted a trigger bar assembly 235 for actuating core rod valves such as those of the apparatus of FIG. 2 so as to allow air to flow in the direction of arrows E, F, G and H through the core rod to blow-up the parison thereon to form a container 217. The trigger bar assembly is described in great detail in U.S. Pat. No. 3,836,305 to William Grazine, the entire contents of which are incorporated by reference herein.

A trigger bar assembly 235 is disposed in each arm 129, 130, 131 of indexing turntable 210. Core rod 211 is secured to turntable 210 by split collar 236. Split collar 236 is secured to face plate 237 by screws 238 that extend through the split collar 236 and are threaded into the face plate 237.

The face plate 237 is secured to turntable 210 by other screws, not shown, which is a conventional molding machine construction.

There is an opening 239 in the face plate 237 for holding the core rod 211.

Core rod 211 has a valve head 215 secured to the outer end thereof.

Extending lengthwise with core rod 211 is operating element 240. Operating element 240 is connected to valve head 215. A spring (not shown) in the core rod 211 holds the valve head 215 closed, and when the operating element 240 has its inner end pushed in the direction of the value head 215 with sufficient force to overcome the spring, the valve head 215 opens. The spring is not shown in FIG. 3 since this description is of conventional structure, well understood in the molding machine art.

The face plate 237 has a groove 241, of rectangular cross-section, extending for most of the length of the face plate 237 and into which the operating element 240 of core rod 211 extends. This groove 241 is of a height slightly less than the diameter of the opening 239 into which the core rod 211 extends. Shoulder 242 is formed at the upper and lower parts of the opening 239 as the result of the lesser height of the groove 241.

There is a corresponding groove 243 in the indexing turntable 210 immediately behind the groove 241 and these grooves 241 and 243 cooperate to form a chamber in which a trigger bar 244 is located.

The trigger bar 244 extends for substantially the entire length of the grooves 241 and 243 with enough clearance from the sides and the ends of the grooves 241 and 243 to permit the trigger bar 244 to move freely in the grooves toward and from the inner ends of the core rod 211.

The trigger bar 244 has a groove 245 extending for the full length of the upper side of the trigger bar 244 and there is a similar groove 246 in the bottom face of the trigger bar 244.

Thin plates 247 are clamped between the face plate 237 and the opposing face of the head 210. These thin plates 247 contact with one another beyond both ends of the trigger bar 244, but they are spaced to provide clearance for the trigger bar 244 along the length of the grooves 241 and 243. The thin plates 247 extend into the grooves 245 and 246 and provide abutments which limit the movement of the trigger bar 244 toward and from the core rod 211.

FIG. 3 shows the trigger bar 244 in its most retracted position; that is furthest away from the core rod 211. The slots (grooves) 245 and 246 are wide enough to permit the trigger bar 244 to move towards the core rod 211 with sufficient motion to move the operating elements 240 to a position to open the core rod valve head 215.

There is a piston 248 behind the trigger bar 244 and this piston 248 slides in a cylindrical guide 249 and is provided with an O-ring 250 for preventing air from escaping past the piston 248 from the chamber in which the trigger bar 244 slides.

There is an upper ball 251 which projects partway into the cylindrical guide 249.

A lower ball 252 moves up and down in another cylindrical guide 253 which extends substantially at right angles to the cylindrical guide 249. A threaded bushing 254 screws into the lower end of the cylindrical guide 253 to prevent the lower ball 251 from dropping out of the guide 253. This bushing 254 can also be used to control the at-rest position of the lower ball 251.

The cylindrical guides 249 and 253 open into a juncture chamber 255 in which there is a stud 72 extending downward into the juncture chamber 255 in a position to serve as a stop for preventing the upper ball 251 from rolling out of its cylindrical guide 255.

A plunger 256 is operated by an actuator 257 which moves the plunger 256 up and down in timed relation with the operation of the indexing head (turntable) 210 and the mold opening and closing apparatus.

When the indexing head 210 is to be rotated to bring a different set of core rods to the blowing station II', the actuator 257 is at rest with the plunger 256 depressed.

When the core rods 211 move into the blowing station II', and the blowing mold halves 258 and 259 (half 259 rests on stationary lower platen 260 and half 258 is moved by upper platen 261) close around the core rod 211, the actuator 257 moves the plunger 256 upwardly into contact with the lower ball 252 and lifts the lower ball 252 upwardly far enough to displace the upper ball 251 to move the trigger bar 244 into position to open valve 215. The center line of pressure through the mold halves 258 and 259 is represented by line CL.

At the end of the blowing operation in station II', the actuator 257 returns the plunger 256 to its depressed, inactive position, and the springs of the valve 215 push the operating element 240, trigger bar 244, piston 248, and balls 251 and 252 back to their original positions as shown in FIG. 3.

Air for the core rod 211 is supplied under pressure to the chamber formed by the grooves 241 and 243 and the distribution of the air lengthwise through this chamber is facilitated by having a manifold passage 262 extending lengthwise of the trigger bar 244 with spaced outlet passages 265, one of which is shown in FIG. 3.

The balls 251 and 252 are free to rotate and they have some random rotation which causes different locations on the surfaces of the balls 251 and 252 to contact with each other at different times so that the cam action of the balls 251 and 252 with respect to one another does not result in friction wear at any particular point of contact of the balls 251 and 252.

Figure 4:
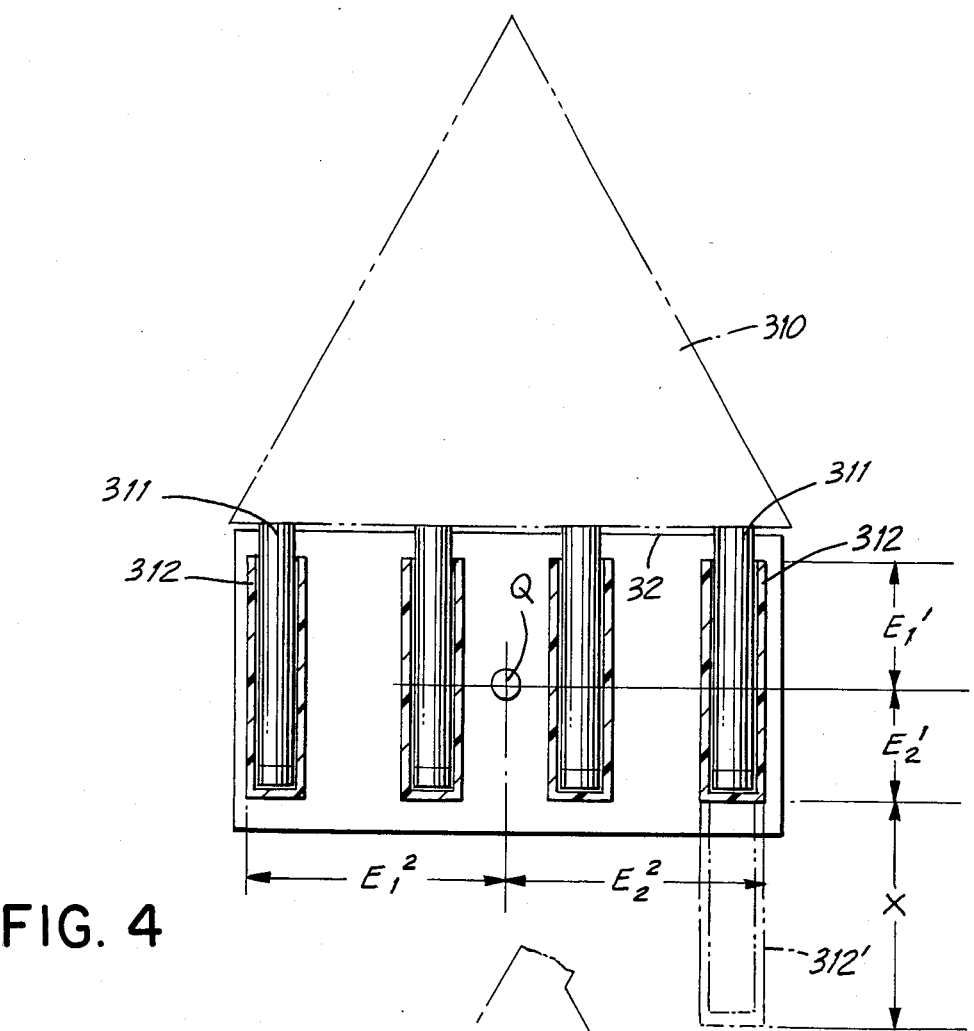
FIG. 4 is a diagrammatic view of the type of apparatus depicted in FIG. 1, but showing core rods on only one side face of the turntable. Also shown on FIG. 4 is the parison size produced by the apparatus of FIG. 3 as compared to the parison size produced by the apparatus of FIG. 2.

In FIG. 4, a turntable - core rod assembly such as shown in FIG. 1 is depicted, wherein core rods 311 having parisons 312 thereon on only one side face 320 of the turntable 210 are shown. Depicted in dotted line fashion is the longer parison 311' which would be required to make a bottle such as depicted in FIG. 2. Point Q represents the intersection of the center line across the core rods 312 and the imaginary line running perpendicularly across the center of side face 320. Distances $E_1^2$ and $E_2^2$ are equal distances and are each the distance from the center of point Q to the outside edge of the outermost parison 312. $E_1^{\;1}$ and $E_2^{\;1}$ are equal distances and are respectively the distance from the beginning of the parison 312 to the center of point Q and the center of point Q to the end of parison 312. Distance X represents the increased parison length produced by the apparatus of FIG. 2. A bottle having the initial parison length $E_1^1 + E_2^1 + X$ cannot be used by the apparatus depicted in FIG. 1, since such long parison length would require a long core rod that could not pass by posts 23 and 24 in FIG. 1. Furthermore, the longer required core rod would cause a pressure unbalance on the clamping mechanism for the molds.

Figure 5:
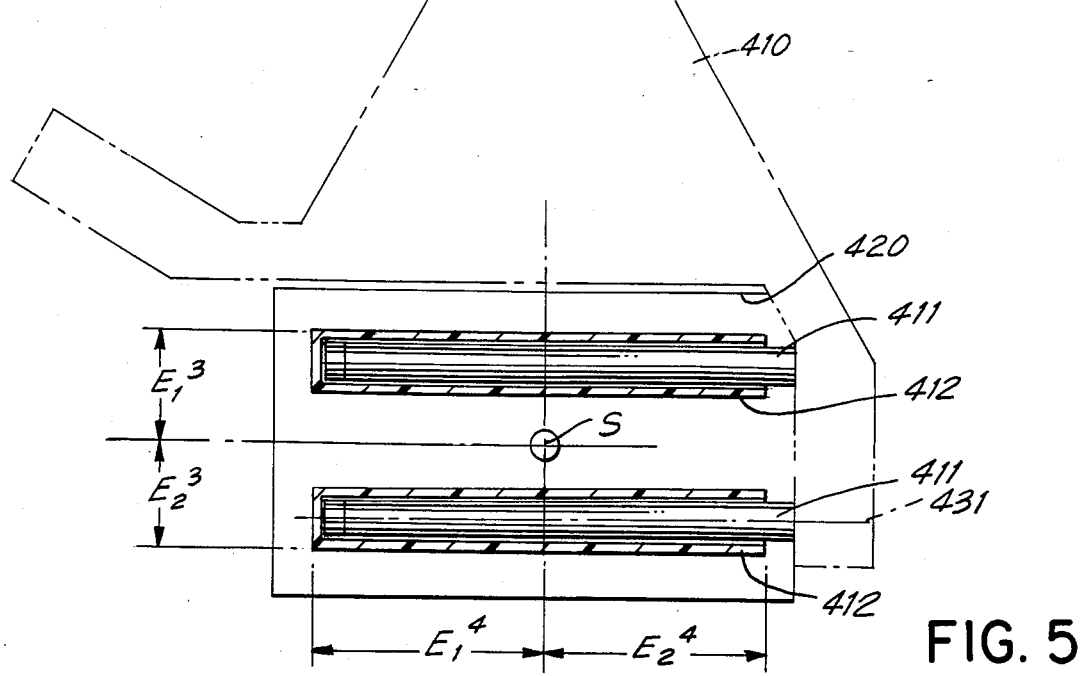
FIG. 5 is a diagrammatic view of the type of apparatus depicted in FIG. 1, but showing core rods 411 with parisons thereon on only one side face of the turntable.

There is shown in FIG. 5 a turntable-core rod assembly according to the present invention and as shown in greater detail in FIG. 2. Core rods 411 having parisons 412 thereon project from arm 431 of turntable 410. Points S represents the intersection of the centerline between the core rods and the imaginary line running perpendicularly through the center of side face 420. Distances $E_1^3$ and $E_2^3$ are equal and represent the distance between the center of point S and the outermost edge of top edge of the upper parison and bottom edge of lower parison of each parison. Distances $E_1^4$ and $E_2^4$ are equal and are each one-half the length of the parison 412 measured outwardly from the center of point S. Distance $E_1^4 + E_2^4$ of FIG. 5 is equal to distance $E_1^1 + E_2^1 + X$ of FIG. 3.

It will be appreciated that the instant specification and claims are set forth by way of illustration and not limitation, and that various modifications and changes may be made without departing from the spirit and scope of the present invention.

What is claimed is:

1. In an apparatus for making a hollow article, wherein the apparatus includes a rotatable polygonal turntable, a parison forming station at one side face of the turntable, a blow molding station at another side face of the turntable and a stripping station at still another side face of the turntable, the improvement comprising means for connecting to the turntable at least one core rod having a longitudinal length on which the parison is formed, such that the longitudinal length of said at least one core rod is parallel to a side face of the turntable and for rotation therewith.

2. An apparatus according to claim 1, wherein the means for connecting the core rod to the turntable comprises at least one extension arm fixed to the turntable and extending perpendicularly outwardly from a side face thereof and means thereof for mounting a core rod perpendicular to the arm.

3. An apparatus according to claim 2 wherein the turntable has at least three side faces, at least one extension arm extending outwardly from each side face and each arm has means for mounting for at least one core rod thereon.

4. An apparatus according to claim 3, wherein each side face has an extension arm extending outwardly therefrom, said arm perpendicular to said side face.

5. An apparatus according to claim 3, wherein two core rods are disposed on said arm.

6. An apparatus according to claim 5, wherein said turntable has the shape of an equilateral turntable and which further comprises a mold enclosing the core rods in the injection station, a mold enclosing the core rods in the blow molding station and three posts, wherein the center of one post is disposed on an imaginary line through the center of the mold in the injector station and the center of another post is disposed on an imaginary line through the center of the mold in the blowing station, the center of each post is disposed on a imaginary line through the point of intersection of each adjacent side face of the turntable and the point of intersection of the imaginary lines through the center and perpendicular to each side face, each of said core rods being disposed an equal perpendicular distance from an imaginary line joining each post.

* * * * *